No. 722,503. PATENTED MAR. 10, 1903.
E. FOURNIER.
DISINFECTING APPARATUS.
APPLICATION FILED MAR. 7, 1902.
NO MODEL.
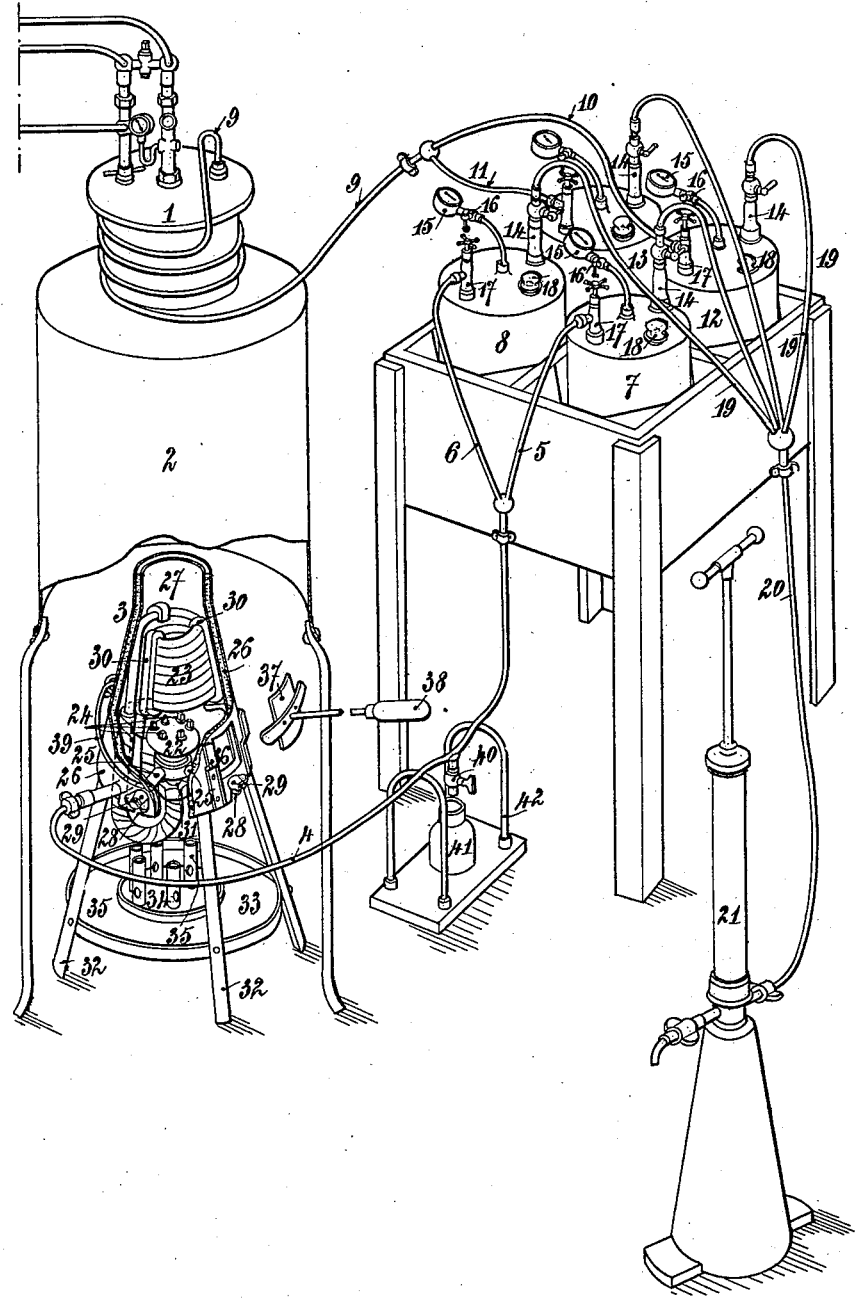
Witnesses
Inventor
Eugene Fournier

UNITED STATES PATENT OFFICE.

EUGENE FOURNIER, OF PARIS, FRANCE.

DISINFECTING APPARATUS.

SPECIFICATION forming part of Letters Patent No. 722,503, dated March 10, 1903.

Application filed March 7, 1902. Serial No. 97,173. (No model.)

*To all whom it may concern:*

Be it known that I, EUGENE FOURNIER, a citizen of the Republic of France, residing at Paris, France, have invented a certain new and useful Improved Disinfecting Apparatus, (for which I have made application for Letters Patent in France, dated January 25; in Germany, dated February 20; in Belgium, dated February 21; in Luxemburg, dated February 22, and in Great Britain, dated February 24, 1902,) of which the following is a specification.

The present invention relates to apparatus for producing vapors suitable for disinfecting and like purposes carried out under intense heat by means of strong flames whereby liquids are vaporized both for heating and disinfecting purposes.

The accompanying drawing shows a complete arrangement of apparatus, certain parts being shown in section or removed in order to show clearly the arrangement of the various parts.

According to the invention the apparatus 1 for producing the vapors for disinfection is arranged on a stand or support 2. The latter contains the apparatus for the preliminary heating of the place to be disinfected, according to the processes and arrangements described in my previous patents. A burner 3 of intense heating power, produced by means of forced flames the construction and operation of which will be explained later on, is connected, by means of a supply-conduit 4, to two branch pipes 5 and 6, connected, respectively, to receptacles 7 and 8, 7 containing petroleum and 8 spirit, while the vaporizing member of the apparatus 1 is connected, by means of a conduit 9, to two branch pipes 10 and 11, connected to receptacles 12 and 13, containing the liquids to be vaporized for the disinfection—for instance, water in the receptacle 12 and formacetone in the receptacle 13. The receptacles 7, 8, 12, and 13 are all arranged in compartments in a casing supported on legs at a convenient height, thereby rendering the manipulation easy.

The combustible liquids (petroleum and alcohol) and the liquids for producing the disinfecting-vapors (water and formacetone) are only mentioned by way of example. Said liquids can be replaced by any others which may be desired or considered more suitable.

Before its junction with the vaporizing member of the apparatus 1 the pipe 9 is wound several times around the body of said apparatus, so that this part of the pipe 9 may be heated to a certain temperature, which is transmitted to the liquid in it in order that the liquid may not enter the vaporizing member in a cold state, thus avoiding the deteriorating effect due to such cause and aiding the vaporization of said liquid.

Each receptacle 7, 8, 12, and 13 is adapted to withstand the necessary feeding pressure (amounting to about four to six kilograms per square centimeter) and comprises the pressure-admission tube 14, the gage-tube 15 with cut-off cock 16, outlet-valve 17, the regulation of which can be effected to any desired degree, and finally a filling-opening closed by a screw-plug 18. The pipes 5 and 6 are connected to the respective outlet or distribution valves 17 of the receptacles 7 and 8, on the one hand, and, on the other hand, to the pipe 4, which communicates with the heating device 3. The receptacles 12 and 13 are connected to the pipes 10 and 11, which in their turn are connected with the pipe 9, communicating with the vaporizing member of the apparatus 1. The tube 14 of each receptacle 7, 8, 12, and 13 is connected by a branch pipe 19 to a common pipe 20, joined to the delivery-tube of a pressure-pump 21. From these arrangements it will be seen that the required pressure being established by means of the pump 21 in each of the receptacles 7, 8, 12, and 13 the liquids contained in them will be compressed and forced to the vaporizer of apparatus 1 and burner 3, respectively. The tubes for admitting pressure and those through which the liquids pass from the receptacles 7 8 12 13 are provided with cocks, which allow these receptacles to be cut off from one another, both for the admission of pressure and for the delivery of liquid to the members mentioned above under the conditions explained.

The filling of the receptacles 7, 8, 12, and 13, which is generally effected through the screw-plug openings 18, can be equally well effected, either directly by means of the pump 21, which would force in all the required liquid through its delivery-tube, or by means of the same pump acting as a vacuum-pump in said receptacles, the cocks 16 of the gages 15 being closed to prevent damage to them and the liquid admitted through the tubes 17 connected to pipes having their free ends immersed in the liquid which is to be introduced into the receptacles.

The burner 3 is constituted by a burner-body comprising a hollow central globe or vessel 22, to the center of the under part of which is connected the end of a serpentine pipe 23, arranged concentrically above the globe 22, the other end of the serpentine coil being bent and extending outwardly in order to join the conduit 4, which supplies the combustible liquid. On the upper part of the globe 22 burners or nozzles 24 are arranged, the number and size of which are selected according to the intensity of the heating power which is required for the apparatus. The globe 22 is, moreover, provided with a support the outwardly-projecting arms 25 of which are situated in the same plane and are of such a length as to be fixed to corresponding points of a truncated casing 26, with its large diameter at the bottom, while the upper part is narrowed and terminates in a cylindrical part 27 to insure the formation of a compact flame from the burners 24. The attachment of the arms 25 of the globe-support to the casing 26, near the bottom of the latter, can be effected in various ways—for instance, as represented in the drawing, by fitting the ends of the arms 25 in slots 28, forming a kind of bayonet attachment by which the whole of the burner is kept at a convenient height in the center of the casing 26, the arms being secured, by means of thumb-screws 29, on the threaded ends of the arms 25 outside the casing 26 and screwing against corresponding outer part of the wall of the casing 26. The spiral coils are held together by clamps 30 of any desired number and arranged in the direction of the height of the serpentine on its outside, the ends of the clamps being bent over the top and bottom coils, thereby locking the whole together. These clamps 30 rest at their lower parts on brackets fixed for that purpose to corresponding points around the circumference of the inner wall of the casing 26 in such a manner that they insure the firm seating of the serpentine 23 and keep it perfectly centered with regard to the burners 24. The combustible liquid enters through the lower coil of the serpentine 23 and becoming vaporized flows upward through the other spiral until it arrives at the top coil, then descends outside the serpentine, between it and the inner wall of the casing 26, and passes through the bend of the tube 31 to the under side of the globe 22, and thence into the interior, where the combustible vapors formed collect and issue from the burners 24. In order to avoid all injurious effect of cooling, the descending part of the serpentine tube and its bent extension to the globe 22, as well as the latter, can be provided with a covering of insulating material, such as asbestos or the like. Another means of avoiding this disadvantage of cooling of the parts in question would be to cause the down-tube of the sepentine to pass inside the coil; but then the excessive heat to which this part when thus arranged would be subject would rapidly wear away the metal and would have a disadvantageous effect on the intensity of the flame. The casing is preferably double and made of sheet-iron conveniently joined by rivets, but leaving a slight space between the two, which is filled with insulating material, (asbestos or the like,) so as to insure in the highest possible degree the concentration of the heat around the serpentine coil 23, the heat of the latter maintained by the burners 24 insuring the continuous volatilization of the combustible liquids, and consequently the constant normal feeding of the burners 24. The casing 26 is supported at any required height on legs 32, in the inside of which a table 33 is fixed, destined to hold an alcohol-burner for the initial heating necessary to set the apparatus in operation. This alcohol-burner may consist of a tray 34 for holding the required quantity of alcohol and is provided with vertical tubes 35 with lower side openings, so as to form Bunsen burners to promote the heating effect. The casing 26 is provided with an opening 36, intended for the inspection of the working of the burners 24 and to clean them when necessary by means of an appropriate fine needle or wire. This opening is closed by a plate 37, which can be conveniently manipulated by means of a handle 38, with which it is provided. The casing 26, moreover, comprises a handle 39, jointed or not, and conveniently arranged to allow easy transport and handling. Finally a discharging device consisting of a cock 40 is interposed in the feed-conduit 4 of the burner, between the latter and the supply-receptacle, which cock closes automatically and when open discharges the liquid from said conduit into a receiver 41, arranged on a support 42. This discharge device can be advantageously used when the heating, and consequently the feeding, in the burner is stopped, because being open at this moment it insures the complete discharge through the conduit 4 of all the combustible liquid which is still stored therein in such a manner that none of the liquid can enter the burner, which can thus be instantly stopped without any smoke or disagreeable odors.

Having stated the various manipulations to which the distribution-tubes for the combustible liquids can be submitted and the necessary amount of liquid for regular circulation of the vapors in the serpentine being ascertained, it is necessary to make use of tubes of a certain diameter with a convenient resistance and capacity; but in this case the inner diameter of the tubes at the entrance to the serpentine vaporizer is too large, thereby causing a too great admission of liquid in the heated spirals, and thus affecting the vaporization and producing hindrances in the working of the burners. In order to overcome this disadvantage, the section of the inlet-opening for the liquid to the serpentine is throttled or reduced by interposing in the tube at a certain distance from each other two obturators or regulators of different sections, the section of the one immediately corresponding with the serpentine being smaller than the other, which is very much reduced in comparison with the section of the inlet-tube.

It has been stated that the receptacles 7 and 8 contained two combustible liquids, petroleum and spirit being mentioned, and for the following reason: It has been ascertained by experiment that it is advantageous to carry out the beginning of the working of the burner with spirit, then after the normal working is set up to continue the heating by means of petroleum. It has also been found to be advantageous a little before the heating is stopped to use spirit for the heating, since by this means the feed-conduits, serpentine coil, and burners which may have become incrusted with petroleum residues are efficiently cleaned. Lastly, the vapors produced from the liquids contained in the receptacles 12 and 13 can be either disinfecting-vapors or water-vapor and disinfecting-vapor. In the latter case the water-vapor or steam could be used both for the projecting into the place to be disinfected when necessary and for cleaning the vaporizing member from the disinfecting liquids.

What I claim as my invention, and desire to secure by Letters Patent, is—

1. An apparatus for producing vapors suitable for disinfecting and like purposes by means of intense heat comprising a liquid-vaporizing apparatus, a heating device, a series of combustible fuel and vaporizable liquid-receptacles, tubes connecting said receptacles to a pressure-pump, branch pipes between the vaporizable liquid-receptacles and the vaporizing apparatus, and branch pipes between the fuel-receptacles and the coil of a vaporizing-burner substantially as described.

2. An apparatus for producing vapors suitable for disinfecting and like purposes by means of intense heat comprising a liquid-vaporizing apparatus, a heating device, a series of combustible fuel and vaporizable liquid-receptacles, tubes connecting said receptacles to a pressure-pump, branch pipes between the vaporizable liquid-receptacles and the vaporizing apparatus, and branch pipes between the fuel-receptacles and the coil of a vaporizing-burner, and an automatic discharge-cock interposed in the tube between the coil and the fuel-receptacles, substantially as described.

3. In apparatus of the kind described a heating device comprising a burner, a vaporizing-coil above said burner having a down-tube exterior of the coil communicating with the burner-body, a support for said burner-body connected to a casing covering the whole, brackets on the interior of the casing to support clamps securing the coils of the serpentine tube together and a preliminary heating device substantially as described.

4. In apparatus of the kind described a heating device with a vaporizing-coil in combination with a petroleum-receptacle and a spirit-receptacle, branch pipes connecting said receptacles to the vaporizing-coil, valves thereon, a pressure-pump and branch tubes connecting said pump to the fuel-receptacle substantially as described.

5. In apparatus of the kind described a heating device with a vaporizing-coil in combination with a petroleum-receptacle and a spirit-receptacle, branch pipes connecting said receptacles to the vaporizing-coil, valves thereon, water and liquid disinfectant receptacles, branch pipes connecting said receptacles with a vaporizing apparatus, a pressure-pump, branch pipes connecting said pump with all the receptacles and cocks upon said pipes substantially as described.

In testimony whereof I have signed my name to this specification in the presence of two subscribing witnesses.

EUGENE FOURNIER.

Witnesses:
LOUIS SULLIGER,
EDWARD P. MACLEAN.